United States Patent [19]

Levine

[11] 4,157,225
[45] Jun. 5, 1979

[54] SLOTTED SHAFT ADAPTER

[76] Inventor: Fred Levine, P.O. Box 380876, Miami, Fla. 33138

[21] Appl. No.: 887,672

[22] Filed: Mar. 17, 1978

[51] Int. Cl.² .............................................. F16D 1/00
[52] U.S. Cl. ...................................... 403/3; 403/287; 403/301; 416/244 R
[58] Field of Search ............... 403/365, 372, 287, 223, 403/302, 301, 383, 356, 3, 4; 74/548; 123/41.46; 416/244 R

[56] References Cited

U.S. PATENT DOCUMENTS

| 2,716,565 | 8/1955 | Harper et al. | 403/289 |
| 3,272,188 | 9/1966 | Sabat | 123/41.46 X |
| 3,386,306 | 6/1968 | Kenyon | 74/548 |
| 3,497,847 | 2/1970 | Schapira | 403/383 X |
| 3,507,508 | 4/1970 | Andrews | 403/383 X |
| 4,065,219 | 12/1977 | Levine | 403/287 |

FOREIGN PATENT DOCUMENTS 259909  7/1949  Switzerland .............................. 403/383

Primary Examiner—Andrew V. Kundrat
Attorney, Agent, or Firm—Clarence A. O'Brien; Harvey B. Jacobson

[57] ABSTRACT

A shaft adapter for a fan motor, and the like, has an elongated configuration with a shaft receiving socket provided in at least one end of the adapter. By cutting away at least a portion of the end of the adapter provided with the socket so as to form a flat portion communicating with the socket and form a flat portion defining a slot, the shaft adapter can be employed with shafts and fan blade hubs provided with flats, set screws, keys, and the like.

7 Claims, 10 Drawing Figures

SLOTTED SHAFT ADAPTER

BACKGROUND OF THE INVENTION

1. Field of the Invention

This invention relates generally to a shaft adapter, and particularly to a shaft adapter useful for converting one shaft size to another to fit a variety of fan hub bore sizes and configurations.

2. Description of the Prior Art

A problem arises with the maintenance of refrigeration units and similar systems that employ cooling and air circulating fans. When a motor or blade of such a fan must be replaced, it is generally impractical for a serviceman to maintain a complete stock of all the different motors and blades that may be encountered. Accordingly, it is not unusual for a serviceman to carry only a single model replacement motor and associated fans for the commonly encountered capacity fan assemblies. Another situation is encountered where only the motor or blade of a fan assembly need be replaced and the shaft diameter and/or shaft length of the existing unit is different from the replacement fan motor or fan blade. Thus, it is desirable to have a shaft adapter which will permit the diameter of the shaft to be converted between that of the standard replacement motors and various other shaft diameters.

My copending, allowed application for U.S. patent, Ser. No. 718,039, entitled Shaft Adapter, and filed Aug. 26, 1976, discloses a shaft adapter which facilitates adaptation of a standard diameter motor shaft to another diameter, and also extends the length of the shaft to a user's requirements. Further, the shaft adapter disclosed in this copending application can be readily cut to proper size so as to eliminate surplus length of the adapter. A limitation on the possible use of my prior invention, however, is that the adapter cannot be readily employed with shafts and fan hubs having flat portions, or which employ set screws, keys, and the like.

U.S. Pat. No. 2,937,042, issued May 17, 1970, to S. Wilder, Jr., discloses a shaft coupling including a sleeve formed from a strip which forms a slot for receiving a key. This key, however, is merely employed to lock one shaft to another. Further, U.S. Pat. No. 2,807,485, issued Sept. 24, 1957, to L. H. Seibert, discloses a machine key arrangement wherein a cylindrical key provided with a slot for receiving a set screw helps retain a shaft on a hub, and the like, while U.S. Pat. No. 2,754,920, issued July 17, 1956, to E. H. Derry, discloses a reversible hub for a fan wherein a set screw is employed to help retain the fan hub on an associated shaft. In addition, U.S. Pat. No. 3,700,271, issued Oct. 24, 1972, to G. Blaurock, et al., discloses a tubular spacer ring for frictionally fastening a shaft in the oversized bore of a machine element, which arrangement is generally suitable only for larger equipment, and only practical for installation during manufacture of original equipment.

SUMMARY OF THE INVENTION

It is an object of the present invention to provide a shaft adapter capable of adapting various shaft sizes to fit a variety of bore sizes and types, including set screw and key connections.

It is another object of the present invention to provide a shaft adapter for fan assemblies used with refrigeration units, and the like, which can be used in conjunction with other adapters to afford complete flexibility and replacement capability for servicemen operating in the field.

It is a still further object of the present invention to provide a shaft adapter for fan assemblies used with refrigeration units, and the like, which is specifically intended for the repair and replacement field as opposed to original equipment manufacturing, where each component can be made to fit the requirements of the particular model or product being manufactured so that all elements will fit together easily to create a whole.

These and other objects are achieved according to the present invention by providing a shaft adapter having an elongated member provided with a pair of spaced ends, a socket being provided at one of the ends, and with the elongated member having a flat portion provided in the one of the ends, the flat portion communicating with the socket and forming a slot in conjunction with the socket.

The elongated member advantageously has a circular cross section at the other of the ends thereof and extends longitudinally between the spaced ends of the member, with the socket either extending entirely through the elongated member along the axis of symmetry thereof, or extending only about one half the longitudinal extent of the member. Further, while the slot formed by the flat portion extending into the socket may be open at the portions of the socket and slot immediately adjacent the end of the elongated member from which the socket extends into the member, a web can be disposed spanning the socket immediately adjacent the one of the ends of the elongated member for partially defining and closing the slot.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
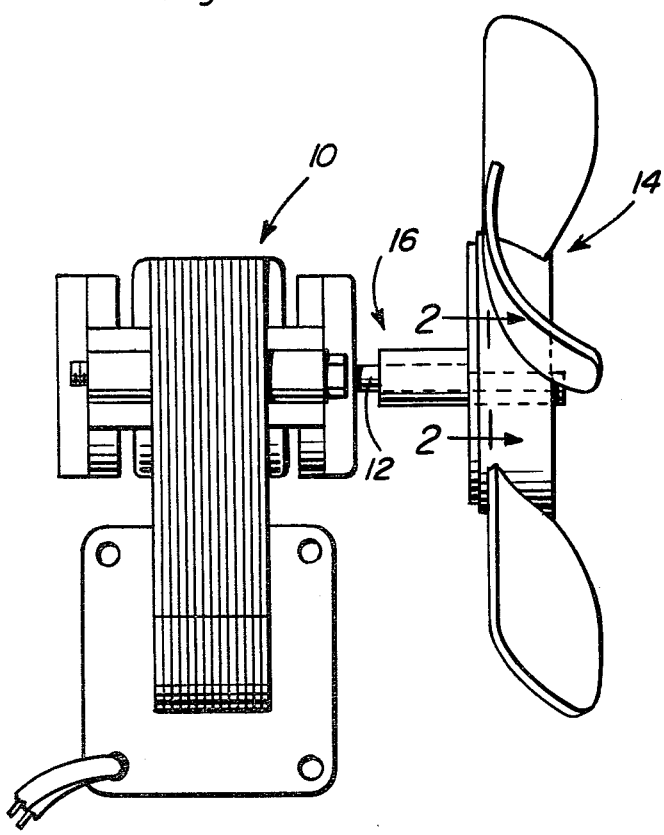
FIG. 1 is a schematic, side elevational view showing a fan blade mounted on a fan motor shaft by a shaft adapter according to the present invention.
Figure 2:
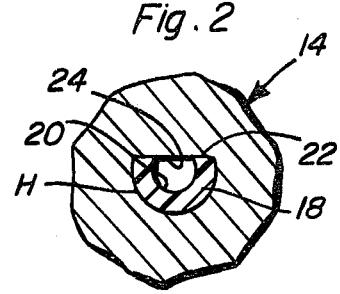
FIG. 2 is an enlarged, fragmentary, sectional view taken generally along the line 2—2 of FIG. 1.
Figure 3:
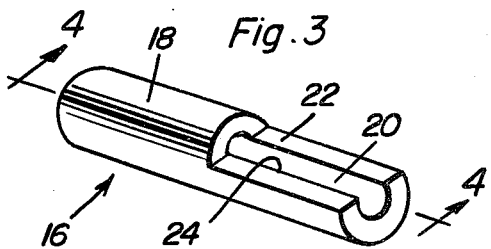
FIG. 3 is an enlarged, perspective view showing a shaft adapter according to the FIGS. 1 and 2.

Referring now more particularly to FIGS. 1 through 4 of the drawing, a fan motor 10 of generally conventional construction is provided with an output shaft 12 on which is mounted a fan blade 14, also of conventional construction, by use of a shaft adapter 16 according to the present invention.

Shaft adapter 16 comprises an elongated member 18 having a pair of spaced ends in one of which ends is provided a socket 20. In the embodiment of the invention as seen in FIGS. 1 through 4, the elongated member is substantially cylindrical in shape, with the other of the ends having a circular cross section, and extends longitudinally between the ends thereof, with socket 20 extending entirely through elongated member 18 along such axis of symmetry. By so providing socket 20, the shaft adapter 16 can be employed to mount a shaft or fan blade at either end thereof as the shape of either the shaft or hub bore of the fan blade requires. More specifically, a flat portion 22 is provided on one of the ends of elongated member 18 with flat portion 22 communicating with the cylindrical socket 20 so as to form a slot 24 extending substantially, for example, one half the longitudinal length of elongated member 18. As will be discussed in greater detail below, the formation of flat portion 22 and slot 24 will permit the adapter 16 to be employed with either fan blade hubs or motor shafts having flattened portions, or which are used in conjunction with set screws, keys and keyways, and the like.

Figure 4:
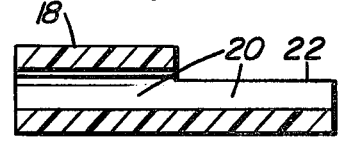
FIG. 4 is a sectional view taken generally along the line 4—4 of FIG. 3.

As seen in FIG. 4, the O.D. of the entire adapter is uniform throughout to fit a bore of, for example, 0.250. Since the I.D. of the slotted section is slightly larger, it will fit the shaft loosely but will compress into a slightly smaller fan bore (say 0.218) very tightly while still fitting the basic design size (say 0.250) comfortably.

Figure 5:
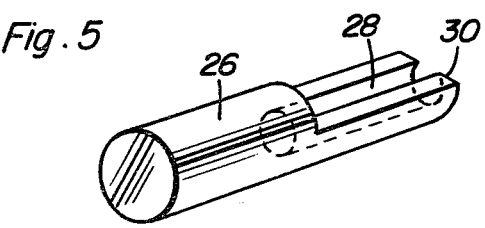
FIG. 5 is a perspective view showing a modified embodiment of a shaft adapter according to the present invention.

Referring now more particularly to FIG. 5, a shaft adapter is illustrated which includes an elongated member 26 of substantially cylinder configuration in the manner of member 18, but which is provided with a socket 28 that extends only substantially one half of the longitudinal extent of member 26 from end to end thereof. This member 26 is provided with a flat portion 30 similar to flat portion 22 which extends the length of socket 28.

Figure 6:
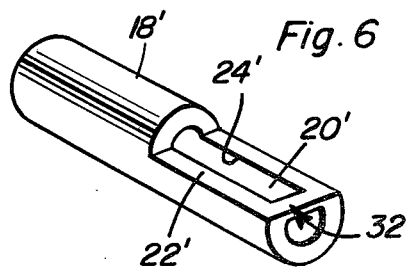
FIG. 6 is a perspective view similar to FIG. 3, but showing yet another embodiment of a shaft adapter according to the present invention.

FIG. 6 discloses a shaft adapter which is virtually identical to shaft adapter 16 and comprises an elongated member 18' similar to member 18 and provided with a socket 20' extending therethrough and which has associated therewith a flat portion 22'. This modified shaft adapter, however, is provided with a web 32 across the one of the ends thereof from which the socket 20' extends into elongated member 18' along the longitudinal extent thereof. This web 32 is disposed spanning socket 20' immediately adjacent the one of the ends of the member 18' for partially defining and enclosing the associated slot 24'. By this arrangement which is provided with the socket 20' and flat portion 22' will be rigidlfied, especially when used to received a shaft (not shown) provided with a flattened side.

Figure 7:
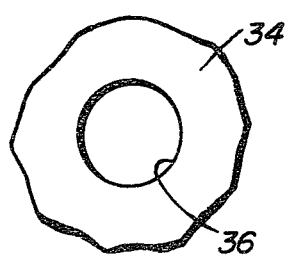
FIGS. 7, 8, 9 and 10 are fragmentary, front elevational views, showing various fan hub configurations which will accommodate a shaft adapter according to the present invention.
Figure 8:
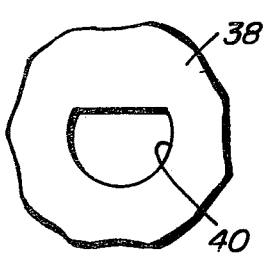
Figure 9:
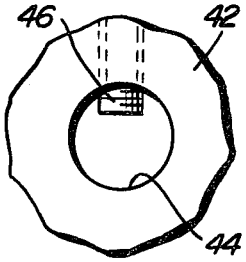
Figure 10:
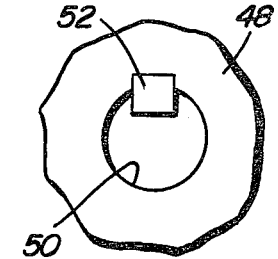

Referring now more particularly to FIGS. 7 through 10, there are illustrated various possible hub configurations of a, for example, fan blade which can be mounted on a shaft by a shaft adapter according to the present invention. In FIG. 7, a hub 34 is provided with a generally circular bore 36 which provides no problem, while in FIG. 8, the hub 38 is illustrated as having a bore 40 flattened on one side so as to fittingly receive the flat portion of a shaft adapter according to the present invention. Further, FIG. 9 illustrates a hub 42 provided with a generally circular bore 44 into which extends in a conventional manner a set screw 46 engageable in the slot of a shaft adapter according to the present invention, while FIG. 10 illustrates a hub 48 provided with a bore 50 having a keyway in which is disposed a key 52 also receivable in a slot of a shaft adapter according to the present invention. As will be appreciated, a shaft adapter according to the invention can be employed with shafts having configurations and fittings similar to those shown in FIGS. 7 through 10.

As can be readily understood from the above description and from the drawings, a shaft adapter according to the present invention readily permits motor shafts of various sizes and types to fit a variety of fan bore sizes and types in a simple yet rugged and reliable manner permitting servicemen in the field to readily adapt available equipment to any refrigeration unit, and the like, that may be encountered.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A shaft adapter for fan motors, comprising an elongated member having a pair of spaced ends, a socket provided in one of the ends, with the elongated member having a flat portion provided on the one of the ends, the flat portion communicating with the socket and forming a slot therewith, the elongated member having a circular cross section at the other of the ends which circular cross section extends longitudinally between that end and the flat portion, and the socket extending entirely through the elongated member between the ends thereof, the I.D. of the slotted section of the socket being slightly larger than the I.D. of the enclosed section of the socket, thereby enabling the slotted section to convert the basic shaft O.D. to fit more than one bore size.

2. A structure as defined in claim 1, wherein a web is disposed spanning the socket immediately adjacent the one of the ends of the elongated member for partially defining and closing the slot.

3. In combination with a fan motor having a shaft and with a fan blade, a shaft adapter for mounting the fan blade on the shaft of the fan motor, the shaft adapter comprising an elongated member having a pair of spaced ends, a socket provided in one of the ends of the elongated member, with the elongated member having a flat portion provided on the one of the ends, the flat portion intersecting the socket and forming a slot therewith.

4. A structure as defined in claim 3, wherein the elongated member has a circular cross section at the other of the ends which circular cross section extends longitudinally between that end and the flat portion, and the socket extending entirely through the elongated member between the ends thereof.

5. A structure as defined in claim 4, wherein a web is disposed spanning the socket immediately adjacent the one of the ends of the elongated member for partially defining and closing the slot.

6. A structure as defined in claim 3, wherein the elongated member has a circular cross section at the other of the ends which circular cross section extends longitudinally between that end and the flat portion with the socket extending substantially one half of the longitudinal extent of the longitudinal member and the flattened portion extending substantially coextensively with the socket.

7. A structure as defined in claim 3, wherein a web is disposed spanning the socket immediately adjacent the one of the ends of the elongated member for partially defining and closing the slot.

* * * * *